United States Patent Office

2,803,663
Patented Aug. 20, 1957

2,803,663

STABILIZATION OF CHLORO ORGANIC COMPOUNDS

Gustave K. Kohn, Berkeley, Calif., assignor to California Spray-Chemical Corporation, Richmond, Calif., a corporation of Delaware No Drawing. Application June 13, 1955,
Serial No. 515,230

4 Claims. (Cl. 260—611.5)

This invention relates to a method of stabilizing normally solid chloro organic compounds, and particularly such compounds as contain a terminal chloroethane group, against catalytic dehydrochlorination at temperatures above their melting point and to the stabilized composition produced thereby.

It has been recognized that 2,2-bis(p-chlorophenyl)-1,1,1-trichloroethane (DDT) and analogous chloro compounds undergo decomposition through a dehydrochlorination reaction when subjected to temperatures above their melting point in the presence of certain catalytic agents such as iron, chromium, aluminum and their salts, as well as certain absorbent materials such as fuller's earth, kaolin, talc, etc. (Fleck and Haller, Journal of The American Chemical Society, vol. 66, page 2095; Industrial and Engineering Chemistry, vol. 37, page 403). This type of decomposition has created serious handling and processing problems, as well as application restrictions and, in the case of the chloro toxicants, has resulted in appreciable loss of toxicant activity.

In accordance with the present invention, it has been discovered that such normally solid chloro organic compounds as are susceptible to decomposition at temperatures above their melting point may be stabilized against catalytic dehydrochlorination by the incorporation of minor amounts of a neutral organic ester of an acid of phosphorus. Generally, this method of inhibiting dehydrochlorination decomposition may be applicable to the unstable chloro organic compounds which possess a melting point in the range of 75°–150° C., and preferably such compounds as contain a terminal chloroethane group which which may be subjected to temperatures above their melting point and below their thermal decomposition temperature and are in contact with dehydrochlorination catalysts such as iron, aluminum and chromium.

As a specific embodiment and for the purpose of illustrating the detailed aspects of the invention, reference is directed to the class of chloro organic compounds which may be represented by the structural formula:

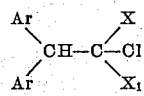

in which Ar represents an aromatic radical and X and $X_1$ represent hydrogen or chlorine, with specific emphasis on such compounds as possess toxicant properties such as DDT.

In the toxicant, or insecticide, field, one of the largest uses of the normally solid chloro organic toxicants is in the formulation of dust concentrates suitable for field dilution and application. By reason of the dehydrochlorination decomposition of these compounds at temperatures above their melting point, it has been necessary to prepare such formulated concentrates by low-temperature grinding or air milling with necessary sacrifice in uniformity of product with respect to distribution of toxicant and particle size.

Aside from the presence of dehydrochlorination catalysts which may be found in the inert fillers with which the toxicant is to be comminuted, the technical grades of DDT and its analogues are contaminated with positive concentrations of metals such as iron, which presumably are derived from containers and piping employed in their production. For example, 50 to 100 p. p. m. of iron, as well as traces of other metals, have been consistently found in technical DDT. It was noted that when technical DDT was maintained above its melting point and below 140° C. many samples would spontaneously decompose. This decomposition was accompanied by the evolution of large quantities of hydrogen chloride and appreciable darkening of the molten product in spite of the fact that all care was taken to avoid the presence of iron or aluminum in the melt equipment.

Through the incorporation of small amounts of a neutral organic ester of an acid of phosphorus in technical DDT and analogous chloro toxicants, it has been found possible to inhibit the dehydrochlorination decomposition and thereby process the toxicant in molten form without decomposition and loss of toxicant activity. As a result, toxicant dust concentrates may be prepared by spraying DDT at a temperature above its melting point upon a filler to obtain a uniform concentrate of optimum particle size. This melt method of preparing toxicant concentrates requires storage and processing of the DDT at a temperature above its melting point and usually at temperatures at which its viscosity and flow characteristics are optimum, normally between 90° and 130° C.

An additional characteristic of DDT and its analogous chloro compounds is the fact that in their technical grade they exist as a mixture of isomers which crystallize slowly on reduction of temperature below the setting point and remain for long periods of time as a hard glass. This factor accentuates the difficulties in processing of the technical toxicant and has been found to be alleviated by the inhibiting concentrations of the neutral ester of an acid of phosphorus.

Although phosphorus pentoxide itself will substantially control the dehydrochlorination reaction in the presence of catalytic metals such as iron, the action of $P_2O_5$, although positive, was slow and was ineffective for inhibition of decomposition which had already been initiated. An additional disadvantage to the use of $P_2O_5$ as the inhibitor was its insolubility in the chloro toxicants which resulted in clogging of spray nozzles. Contrariwise, the neutral organic esters of a phosphorus acid possess an appreciable solubility in the chloro organic compounds and result in immediate inhibition action, even where the dehydrochlorination reaction was already in progress.

The particular choice of inhibitor from the class of neutral organic esters of an acid of phosphorus will be dependent upon a number of factors such as the composition of the particular chloro organic compound to be stabilized, the solubility characteristics of the inhibitor, etc. In general, the neutral alkyl esters have been found to possess optimum solubility characteristics in the chloro organic compounds. Particularly preferred are the trialkyl phosphate esters and preferably such esters as contain from 1 to 5 carbon atoms in the alkyl group. These trialkyl phosphate esters have been found to possess optimum solubility and prompt inhibition action in controlling the dehydrochlorination reaction.

The general class of inhibitors or stabilizers have been found effective at concentrations as low as 0.3% by weight in stabilizing chloro organics in which the catalytic dehydrochlorination metal is present as a contaminant in the product. The optimum concentration of the inhibitor may vary with the degree of inhibition required and the amount of catalytic metal in contact with the chloro organic compound. Generally, concentrations of a tri-organic phosphate in the range of 0.1 to 2.0% by weight will effectively inhibit the dehydrochlorination reaction during conventional processing of the molten chloro organic compound.

In applying the subject method of stabilization or in utilizing the resulting stabilized chloro organic compounds, such environmental conditions are contemplated as would, in the absence of the inhibitors of the invention, result in decomposition of the chloro organic compound through a catalytic dehydrochlorination reaction. As this dehydrochlorination decomposition reaction is primarily effective at elevated temperatures, the chloro organic compound to be stabilized would normally be in a substantially anhydrous state and preferably in a solid or nonsolvent system. However, in the processing of the chloro organic compounds in a molten state, the viscosity and flow characteristics may be modified by the incorporation of varying types and concentrations of solvents. Additionally, although reference has been made by inference to the use of the unstable chloro organic compound as a single component, the subject invention may also be applied to mixtures of the chloro organic compound to be stabilized with other components such as other toxicants employed in the preparation of dust concentrates, etc.

As an illustration of the effectiveness of the subject inhibitors in stabilizing DDT and analogous chloro organic compounds, experiments were conducted in which 100-gram samples of technical DDT were placed in scrupulously clean and covered glass beakers and kept at temperatures between 120° and 130° C. for periods varying from 1 hour to several days. Many samples began to evolve hydrogen chloride almost immediately upon reaching the desired temperatures. Such samples would darken and, in the period of an hour, would change from a very light amber to an opaque black.

The following results were obtained employing representative neutral organic esters of a phosphorus acid, and the concentration of inhibitor is expressed in percent by weight of additive per 100 grams of DDT.

| Additive | Conc., percent | Fe Nails Added | Color After 16 hrs., 120° C. | Crystallization Observed 10 mins. After Removal From Oven |
|---|---|---|---|---|
| None | | No | Dark brown | None (even after several hours). |
| Do | | Yes | Opaque black | Do. |
| Triethyl phosphate | 0.1 | No | Dark amber | None. |
| Do | 0.1 | Yes | Opaque black | Do. |
| Do | 0.25 | No | Dark amber | Do. |
| Do | 0.25 | Yes | Black | Do. |
| Do | 0.5 | No | Light amber | Yes. |
| Do | 0.5 | Yes | Darker than above. | Yes. |
| Do | 0.75 | No | Light amber | Yes. |
| Do | 0.75 | Yes | do | Do. |
| Do | 1.0 | No | do | Do. |
| Do | 1.0 | Yes | do | Do. |
| Do | 2.0 | No | do | Do. |
| Do | 2.0 | Yes | do | Do. |
| Tributyl phosphate | 1.0 | No | do | Do. |
| Do | 1.0 | Yes | do | Do. |
| Tricresyl phosphate | 1.0 | No | Amber | Do. |
| Do | 1.0 | Yes | Darker than above. | No—but shortly thereafter. |
| Triethyl phosphite | 1.0 | No | Light amber | Yes. |
| Do | 1.0 | Yes | do | No—but shortly thereafter. |

In attempting to employ the melt method of preparing DDT dust concentrates on a commercial scale, it was found that generally two out of every three melt batches would grossly decompose prior to the addition of the subject inhibitors, after which decomposition was immediately stopped. In one such instance, a batch of technical DDT was introduced to the melt tank and heat was applied. At the point where the DDT was about 90% melted with the temperature at 248° F., it was noted that the batch started to break down and evolve hydrogen chloride fumes. At this point, 7½ pounds (1% by weight) of triethyl phosphate was introduced into the melt tank and it was noted that the reaction stopped immediately with no further decomposition during the balance of the melting and spraying period. The temperature of the molten DDT was 250° F. during the spraying period.

As an illustration of the effect of the subject method of stabilization on chloro toxicants other than DDT, experiments were conducted to determine the effect of the subject inhibitors on the decomposition of two other representative chloro organic compounds, namely, 2,2-bis(p-methoxyphenyl) - 1,1,1 - trichloroethane (methoxychlor) and 2,2-bis(p-chlorophenyl)-1,1-dichloroethane (DDD). In these experiments, 100-gram samples of the technical grade of chloro toxicant containing normal contaminating concentrations of catalytic metals were maintained at 120° C. for varying periods of time, both with and without the addition of 1% by weight of triethyl phosphate. The results obtained were as follows:

| | Additive | Hrs. at 120° C. | Result |
|---|---|---|---|
| DDD | No | 16 | Very dark—gross decomposition. |
| DDD | Yes | 16 | Light amber—no decomposition. |
| Methoxychlor | No | 56 | Very dark—gross decomposition. |
| Do | Yes | 56 | Light amber—no decomposition. |

Obviously, many modifications and variations of the invention as hereinbefore set forth may be made without departing from the spirit and scope thereof, and therefore only such limitations should be imposed as are indicated in the appended claims.

I claim:
1. The method of stabilizing a normally solid chloro organic compound which is subject to catalytic dehydrochlorination at temperatures above its melting point, which comprises incorporating with said compound a minor proportion of a trialkyl phosphate ester in which the alkyl radicals contain from 1 to 5 carbon atoms.

2. A method of stabilizing a chloro organic compound possessing a terminal chloroethane group and having a melting point in the range of 75°–150° C. which is subject to dehydrochlorination at temperatures above its melting point, which comprises incorporating with said compound a minor proportion of a trialkyl phosphate ester in which the alkyl radicals contain from 1 to 5 carbon atoms.

3. A method of inhibiting decomposition occasioned by dehydrochlorination of a compound of the following formula:

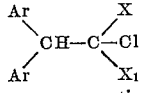

in which Ar represents an aromatic radical and X and X₁ are selected from the group consisting of hydrogen and chlorine, which compound possesses a melting point in the range of 75°–150° C. and is subjected to temperatures above its melting point and below its thermal decomposition temperature in the presence of dehydrochlorination catalysts, which comprises incorporating with said compound at least 0.1% by weight of a trialkyl phosphate in which the alkyl radicals contain from 1 to 5 carbon atoms.

4. A composition stabilized against dehydrochlorination in the presence of catalytic metals, comprising a compound of the formula:

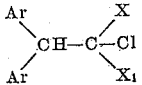

in which Ar represents an aromatic radical and X and $X_1$ represent an element consisting of hydrogen and chlorine, and at least 0.1% by weight, based on said compound, of a trialkyl phosphate ester in which the alkyl radicals contain from 1 to 5 carbon atoms.

References Cited in the file of this patent

UNITED STATES PATENTS

| | | |
|---|---|---|
| 2,298,638 | Prutton | Oct. 13, 1942 |
| 2,630,442 | Church et al. | Mar. 3, 1953 |
| 2,770,610 | Hardy et al. | Nov. 13, 1956 |